United States Patent
White et al.

(10) Patent No.: US 9,348,526 B2
(45) Date of Patent: May 24, 2016

(54) PLACEMENT ENGINE FOR A BLOCK DEVICE

(71) Applicant: Scale Computing, Inc., Indianapolis, IN (US)

(72) Inventors: Philip Andrew White, San Francisco, CA (US); Hank T. Hsieh, San Francisco, CA (US)

(73) Assignee: Scale Computing, Inc., Indianapolis, IN (US)

( * ) Notice: Subject to any disclaimer, the term of this patent is extended or adjusted under 35 U.S.C. 154(b) by 111 days.

(21) Appl. No.: 14/229,748

(22) Filed: Mar. 28, 2014

(65) Prior Publication Data

US 2015/0277789 A1    Oct. 1, 2015

(51) Int. Cl.
*G06F 12/00* (2006.01)
*G06F 13/00* (2006.01)
*G06F 3/06* (2006.01)

(52) U.S. Cl.
CPC .............. *G06F 3/0619* (2013.01); *G06F 3/065* (2013.01); *G06F 3/0689* (2013.01)

(58) Field of Classification Search
None
See application file for complete search history.

(56) References Cited

U.S. PATENT DOCUMENTS

| 8,578,127 | B2 * | 11/2013 | Thatcher | G06F 3/0604 711/103 |
| 2005/0120177 | A1 * | 6/2005 | Black | G06F 3/0607 711/114 |
| 2010/0162238 | A1 * | 6/2010 | Warfield | G06F 9/45533 718/1 |
| 2010/0199041 | A1 * | 8/2010 | Schnapp | G06F 3/0605 711/114 |
| 2010/0257140 | A1 * | 10/2010 | Davis | G06F 17/30073 707/661 |
| 2014/0068211 | A1 * | 3/2014 | Fiske | G06F 11/1456 711/162 |

* cited by examiner

*Primary Examiner* — Sean D Rossiter
(74) *Attorney, Agent, or Firm* — Zilka-Kotab, PC

(57) ABSTRACT

A system, method, and computer program product are provided for implementing a reliable placement engine for a block device. The method includes the steps of tracking one or more parameters associated with a plurality of real storage devices (RSDs), generating a plurality of RSD objects in a memory associated with a first node, generating a virtual storage device (VSD) object in the memory, and selecting one or more RSD objects in the plurality of RSD objects based on the one or more parameters. Each RSD object corresponds to a particular RSD in the plurality of RSDs. The method also includes the step of, for each RSD object in the one or more RSD objects, allocating a block of memory in the RSD associated with the RSD object to store data corresponding to a first block of memory associated with the VSD object.

19 Claims, 8 Drawing Sheets

PLACEMENT ENGINE FOR A BLOCK DEVICE

FIELD OF THE INVENTION

The present invention relates to virtual machines, and more particularly to a reliable file system.

BACKGROUND

Scalable computing provides a solution to today's varying demands for processing resources when managing a data center or distributed database system. A provider provisions a common pool of hardware resources to handle incoming requests from a plurality of clients. As demands grow for the provider's service, the provider may add additional hardware resources to the pool. Virtual Machines (VMs) enable many logical computers to share the common pool of hardware resources. For example, a cluster of three nodes (i.e., three independent processors, each processor having a set of independent resources such as hard disk drives (HDDs), network interface controllers (NICs), graphic processing units (GPUs), or the like) may host tens or hundreds of independently executing VMs, each VM running a separate and distinct instance of an operating system that can run software (e.g., an Apache server) for providing services to the clients.

In some instances, data management may be handled by a virtual file system. In other words, a logical storage device may include data distributed among one or more real storage devices such as HDDs. Poorly managed virtual file systems can affect the performance of the virtual machines when the files accessed by the virtual machines are stored in an inefficient manner. Thus, there is a need for addressing this issue and/or other issues associated with the prior art.

SUMMARY

A system, method, and computer program product are provided for implementing a reliable placement engine for a block device. The method includes the steps of tracking one or more parameters associated with a plurality of real storage devices (RSDs), generating a plurality of RSD objects in a memory associated with a first node, generating a virtual storage device (VSD) object in the memory, and selecting two or more RSD objects in the plurality of RSD objects based on the one or more parameters. Each RSD object corresponds to a particular RSD in the plurality of RSDs. The method also includes the step of, for each RSD object in the two or more RSD objects, allocating a block of memory in the RSD associated with the RSD object to store data corresponding to a first block of memory associated with the VSD object.

DETAILED DESCRIPTION

A cluster of nodes is configured such that each node in the cluster of nodes includes a set of hardware resources such as a processor, a memory, a host operating system, one or more storage devices, and so forth. Each node may implement one or more virtual machines that emulate a guest operating system configured to manage a set of virtual resources that emulate the hardware resources of the node. Each node also implements a block engine daemon process that is configured to allocate hardware resources for a set of virtual storage devices. The block engine daemon communicates with a set of client libraries implemented within the virtual machine monitor (i.e., hypervisor). The block engine daemon also implements a real storage device abstraction layer as well as a virtual storage device abstraction layer. The real storage device abstraction layer includes a set of objects corresponding to the one or more storage devices included in the node as well as a set of objects corresponding to one or more additional storage devices included in other nodes of the cluster. The virtual storage device abstraction layer includes a set of objects corresponding to at least one logical storage device accessible by the virtual machines of the node.

The block engine daemon is configured to track various parameters related to the storage devices within the cluster. For example, the block engine daemon maintains data that identifies a location for each of the storage devices connected to the cluster. The block engine daemon may also maintain data related to a failure group identifier assigned to each storage device, utilization statistics related to the storage device (i.e., a percentage of blocks within the storage device that have been allocated or are free), an average measurement of input/output operations per second (IOPS) for each storage device, an average response time for the storage device, etc. Utilizing these parameters, the block engine daemon implements an algorithm defined by a placement specification that selects one or more storage devices from the set of available storage devices from which memory should be allocated to store data corresponding to a particular block of the virtual storage device. The virtual storage device may implement n-way replication of data in order to provide a reliable storage solution for such applications as a distributed database, a web server, and the like.

Figure 1:
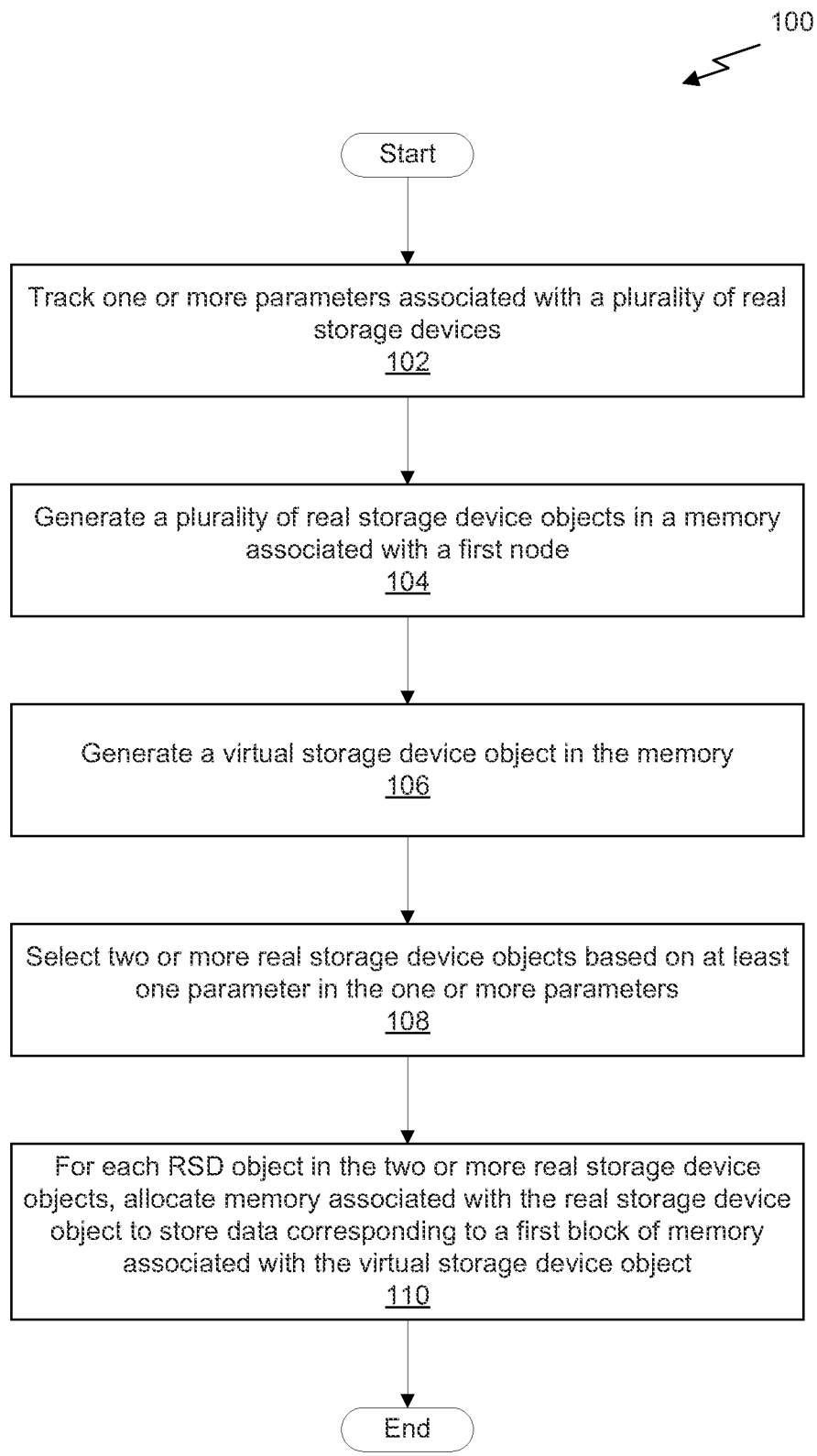
FIG. 1 illustrates a flowchart of a method for allocating memory for blocks of a virtual storage device, according to one embodiment.

FIG. 1 illustrates a flowchart of a method 100 for allocating memory for blocks of a virtual storage device, according to one embodiment. Although the method 100 is described in the context of a program executed by a processor, the method 100 may also be performed by custom circuitry or by a combination of custom circuitry and a program. At step 102, one or more parameters associated with a plurality of real storage devices are tracked. In the context of the following description, a real storage device is any physical device capable of storing data within blocks of memory. For example, real storage devices may include hard disk drives, optical disc drives, solid state drives, magnetic medium, and the like. The real storage devices may be connected to a processor via any of the interfaces well-known in the art such as Serial Advance Technology Attachment (SATA), Small Computer System Interface (SCSI), and the like. In the context of the following description, a virtual storage device is a logical mapping of addresses to physical storage locations. In other words, a logical drive having a contiguous address space may be mapped to a non-contiguous address space contained on a plurality of different real storage devices. Virtual storage devices may also implement redundant data storage, such as by storing multiple copies of data in different locations.

In one embodiment, parameters for each of the real storage devices provisioned within a cluster are tracked by a distributed process. In other words, each node implements a process that maintains records relating to various aspects of the real storage devices coupled to the node. Furthermore, each of the nodes may pass these records to each of the other nodes such that the process maintains information about each of the real storage devices coupled to the cluster. The information maintained by the process may be related to a location of the device within the cluster, manufacturer reported specification related to the device (i.e., a number of tracks, a size per sector, etc.), current performance statistics (e.g., IOPS, number of blocks allocated, number of blocks free, average response time, failure rates, and so forth), and any other relevant information pertaining to the device.

At step 104, a plurality of real storage device objects are generated in a memory associated with a first node. In one embodiment, a block engine server implements a level of abstraction that represents the real storage devices. The level of abstraction may represent each of the real storage devices with a real storage device object, which is an instantiation of a class that includes fields and methods relating to the real storage device and for implementing operations on the real storage device. For example, the fields may include data that indicates a location of the device, a failure group identifier for the device, current performance statistics for the device, and so forth. The methods may include operations for allocating a block of memory within the device to store data, writing data to the device, and reading data from the device.

At step 106, a virtual storage device object is generated in the memory. In one embodiment, the block engine server implements a level of abstraction that represents the virtual storage device. The level of abstraction may represent the virtual storage device with a virtual storage device object, which is an instantiation of a class that includes fields and methods relating to the virtual storage device and for implementing operations on the virtual storage device. For example, the fields may include a mapping table that associates each logical block of memory in the virtual storage device with corresponding block(s) of memory in the real storage device(s), a size of the virtual storage device, current performance statistics for the device, and so forth. The methods may include operations for allocating a block of memory within the device to store data, writing data to the device, and reading data from the device.

At step 108, one or more real storage device objects are selected based on at least one parameter in the one or more parameters. In one embodiment, the two or more real storage device objects are selected in a round-robin fashion based on the value of a counter. In another embodiment, the two or more real storage device objects are selected based on a failure group identifier (i.e., each real storage device object in the two or more real storage device object is required to have a unique failure group identifier). In yet another embodiment, a heuristic value is calculated for each of the real storage device objects, the heuristic value calculated based on a weighted function of scores related to the one or more parameters. The two or more real storage device objects are then selected based on the highest heuristic values. At step 110, for each real storage device object in the two or more real storage device objects, memory associated with the real storage device object is allocated to store data corresponding to a first block of memory associated with the virtual storage device object.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
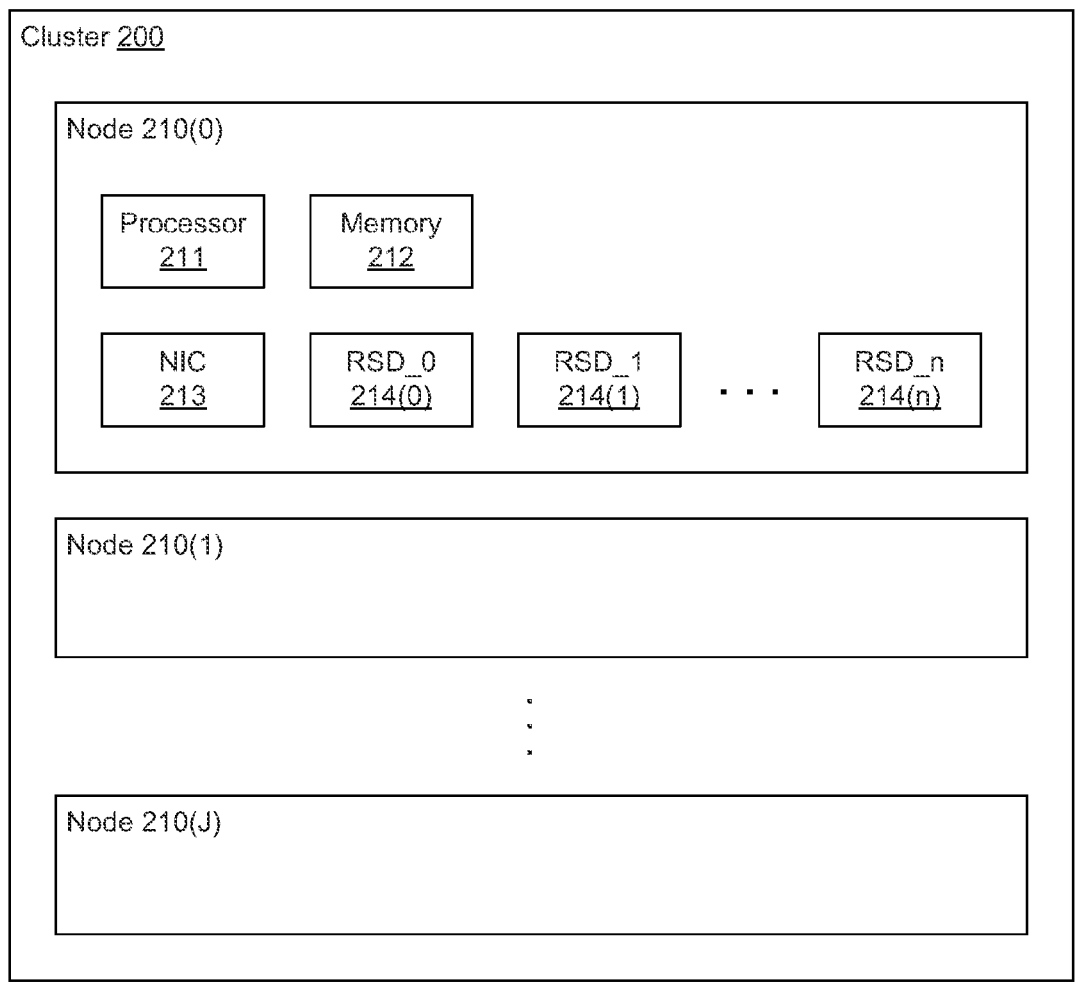
FIG. 2 illustrates a cluster having a plurality of nodes, in accordance with one embodiment.

FIG. 2 illustrates a cluster 200 having a plurality of nodes 210, in accordance with one embodiment. As shown in FIG. 2, the cluster 200 includes J nodes (i.e., node 210(0), node 210(1), . . . , node 210(J−1)). Each node 210 includes a processor 211, a memory 212, a NIC 213, and one or more real storage devices (RSD) 214. The processor 211 may be an x86-based processor, a RISC-based processor, or the like. The memory 212 may be a volatile memory such as a Synchronous Dynamic Random-Access Memory (SDRAM) or the like. The NIC 213 may implement a physical layer and media access control (MAC) protocol layer for a network interface. The physical layer may correspond to various physical network interfaces such as IEEE (Institute of Electrical and Electronics Engineers) 802.3 (Ethernet), IEEE 802.11 (WiFi), and the like. In one embodiment, the memory 212 includes a host operating system kernel, one or more device drivers, one or more applications, and the like. The host operating system kernel may be, e.g., based on the Linux® kernel such as the Red Hat® Enterprise Linux (RHEL) distribution. It will be appreciated that, although not explicitly shown, each node 210 may include one or more other devices such as GPUs, additional microprocessors, displays, radios, or the like.

As used herein an RSD 214 is a physical, non-volatile memory device such as a HDD, an optical disk drive, a solid state drive, a magnetic tape drive, and the like that is capable of storing data. The one or more RSDs 214 may be accessed via an asynchronous input/output functionality implemented by a standard library of the host operating system or accessed via a non-standard library that is loaded by the operating system, in lieu of or in addition to the standard library. In one embodiment, the host operating system may mount the RSDs 214 and enable block device drivers to access the RSDs 214 for read and write access.

The RSDs 214 may implement a file system including, but not limited to, the FAT32 (File Allocation Table—32-bit) file system, NTFS (New Technology File System), or the ext2 (extended file system 2). In one embodiment, each RSD 214 may implement logical block addressing (LBA). LBA is an abstraction layer that maps blocks of the disk (e.g., 512B blocks of a hard disk) to a single unified address. The unified address may be 28-bit, 48-bit, or 64-bit wide that can be mapped, e.g., to a particular cylinder/head/sector tuple of a conventional HDD or other data storage space.

The memory 212 may also include a hypervisor that performs hardware virtualization. In one embodiment, QEMU (Quick EMUlator) is provided for emulating one or more VMs on each node of the cluster 200. In such embodiments, each node 210 may be configured to load a host operating system such as RHEL into the memory 212 on boot. Once the host operating system is running, the QEMU software is launched in order to instantiate one or more VMs on the node 210, each VM implementing a guest operating system that may or may not be the same as the host operating system. It will be appreciated that QEMU may generate VMs that can emulate a variety of different hardware architectures such as x86, PowerPC, SPARC, and the like.

Figure 3A:
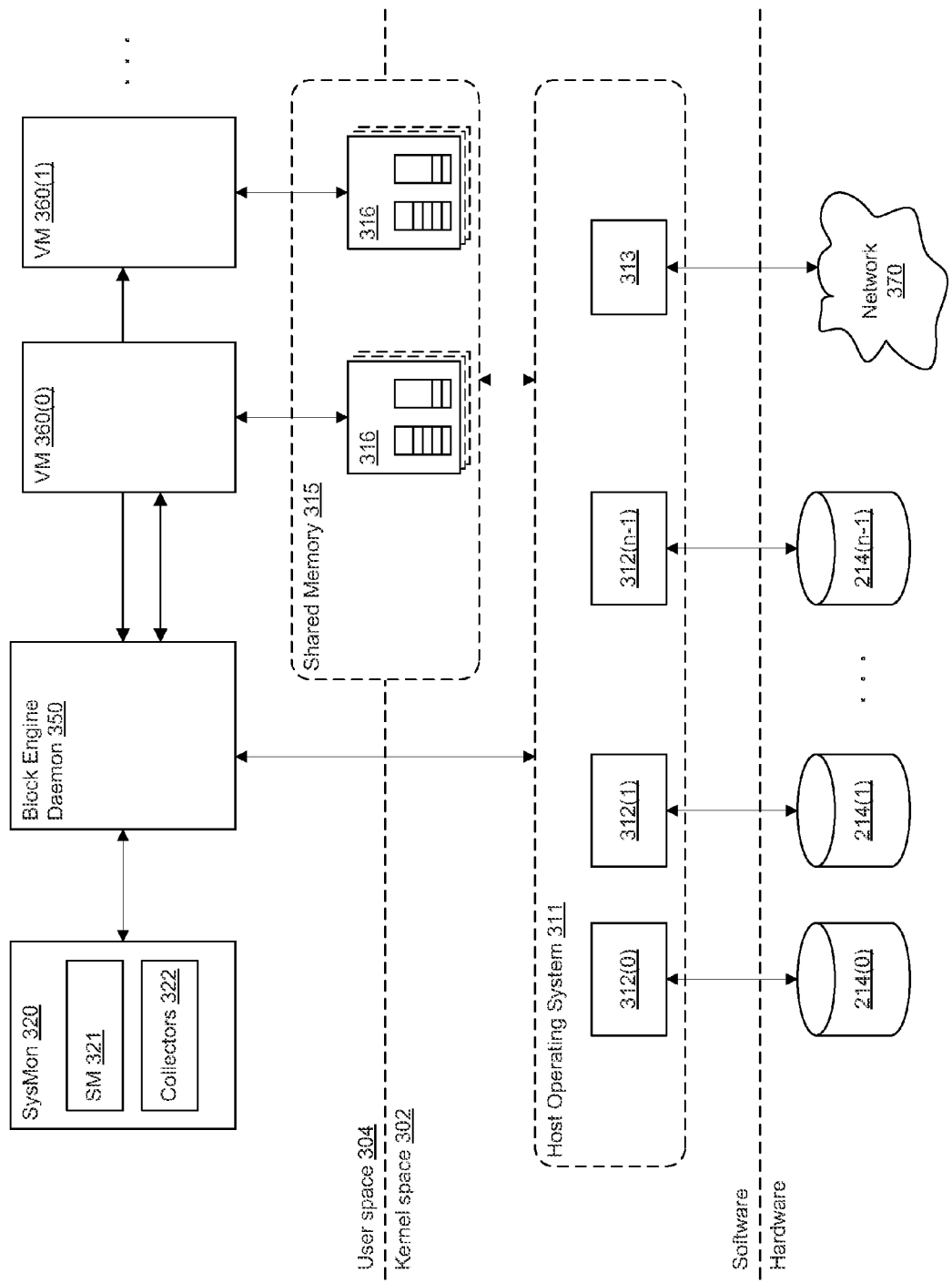
FIGS. 3A & 3B are conceptual diagrams of the architecture for a node of FIG. 2, in accordance with one embodiment.
Figure 3B:
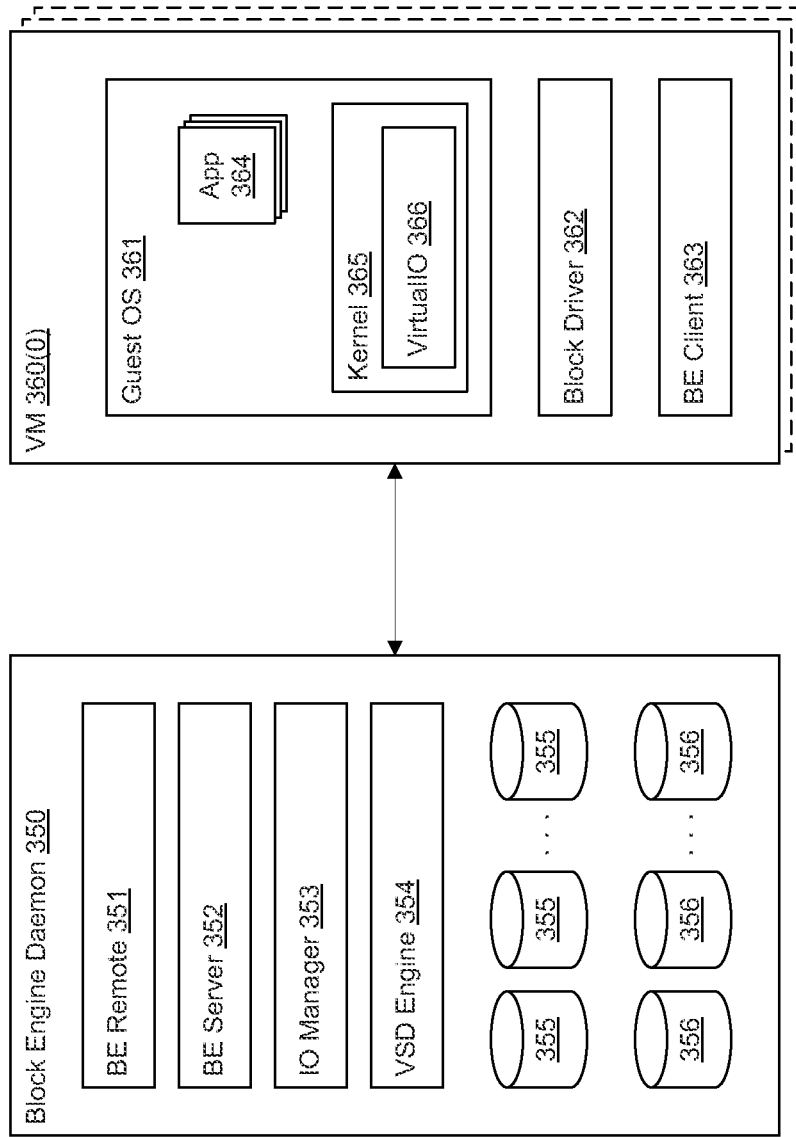

FIGS. 3A & 3B are conceptual diagrams of the architecture for a node 210 of FIG. 2, in accordance with one embodiment. As shown in FIG. 3A, the node 210 may execute a host operating system 311 that implements a protected mode of operation having at least two privilege levels including a kernel space 302 and a user space 304. For example, the host operating system 311 may comprise the Linux® kernel as well as one or more device drivers 312 and 313 that execute in the kernel space 302. The device drivers 312 enable applications in the user space 304 to read or write data from/to the RSDs 214 via a physical interface such as SATA (serial ATA), SCSI (Small Computer System Interface), FC (Fibre Channel), and the like. In one embodiment, the device drivers 312 are generic block device drivers included in the host operating system 311. The device driver 313 enables applications to communicate with other nodes 210 in the cluster 200 via a network interface, which may be wired (e.g., SONET/SDH, IEEE 802.3, etc.) or wireless (e.g., IEEE 802.11, etc.). In one embodiment, the device driver 313 is a generic network driver included in the host operating system 311.

The conceptual diagram in FIG. 3A shows the RSDs 214 and network 370 within the hardware abstraction layer. In other words, the RSDs 214 and network 370 comprise physical devices having a physical interface to the processor 211 in the node 210, either directly or indirectly through a system bus or bridge device. FIG. 3A also illustrates a software abstraction layer that includes objects and processes resident in the memory 212 of the node 210. The processes may be executed by the processor 211. For example, the host operating system 311, system monitor (SysMon) 320, Block Engine (BE) Daemon 350, and virtual machines (VMs) 360 are processes that are executed by the processor 211.

In one embodiment, the host operating system 311 may allocate a portion of the memory 212 as a shared memory 315 that is accessible by the one or more VMs 360. The VMs 360 may share data in the shared memory 315. The host operating system 311 may execute one or more processes configured to implement portions of the architecture for a node 210. For example, the host operating system 311 executes the BE Daemon 350 in the user space 304. The BE Daemon 350 is a background process that performs tasks related to the block devices coupled to the node 210 (i.e., the RSDs 214). The SysMon 320 implements a state machine (SM) 321 and a set of collectors 322 for managing the instantiation and execution of one or more VMs 360 that are executed in the user space 304. In addition, the SysMon 320 may be configured to manage the provisioning of virtual storage devices. VSDs may be mounted to the VMs 360 to provide applications running on the VMs 360 access to the RSDs 214 even though the applications executed by the VMs 360 cannot access the RSDs 214 directly. In one embodiment, the SysMon 320 creates I/O buffers 316 in the shared memory 315 that enable the VMs 360 to read data from or write data to the VSDs mounted to the VM 360. Each VM 360 may be associated with multiple I/O buffers 316 in the shared memory 315. For example, each VSD mounted to the VM 360 may be associated with an input buffer and an output buffer, and multiple VSDs may be mounted to each VM 360.

As shown in FIG. 3B, each instance of the VM 360 implements a guest operating system 361, a block device driver 362, and a block engine client 363. The guest OS 361 may be the same as or different from the host operating system 311. The guest OS 361 comprises a kernel 365 that implements a virtual I/O driver 366 that is logically coupled to a VSD. Each VSD is a logical storage device that maps non-contiguous blocks of storage in one or more RSDs 214 to a contiguous, logical address space of the VSD. The VSD logically appears and operates like a real device coupled to a physical interface for the guest OS 361, but is actually an abstraction layer between the guest OS 361 and the physical storage blocks on the RSDs 214 coupled to the node 210, either directly or indirectly via the network 370. The guest OS 361 may execute one or more applications 364 that can read and write data to the VSD via the virtual I/O driver 366. In some embodiments, two or more VSDs may be associated with a single VM 360.

The block device driver 362 and the BE client 363 implement a logical interface between the guest OS 361 and the VSD. In one embodiment, the block device driver 362 receives read and write requests from the virtual I/O driver 366 of the guest OS 361. The block device driver 362 is configured to write data to and read data from the corresponding I/O buffers 316 in the shared memory 315. The BE client 363 is configured to communicate with the BE server 352 in the BE Daemon 350 to schedule I/O requests for the VSDs.

The BE Daemon 350 implements a Block Engine Remote Protocol 351, a Block Engine Server 352, an I/O Manager 353, and a VSD Engine 354. The Block Engine Remote Protocol 351 provides access to remote RSDs 214 coupled to other nodes 210 in the cluster 200 via the network 370. The BE Server 352 communicates with one or more BE Clients 363 included in the VMs 360. Again, the BE Client 363 generates I/O requests related to one or more VSDs for the BE Server 352, which then manages the execution of those requests via either the Block Engine Remote Protocol 351 (for RSDs 214 connected to other nodes 210 accessible via the network 370) or the I/O Manager 353 (for RSDs 214 connected to the node 210). The I/O Manager 353 enables the BE Daemon 350 to generate asynchronous I/O operations that are handled by the host OS 311 to read from or write data to the RSDs 214 connected to the node 210. Functions implemented by the I/O Manager 353 enable the BE Daemon 350 to schedule I/O requests for one or more VMs 360 in an efficient manner.

In one embodiment, the BE Daemon 350 also implements a VSD Engine 354. The VSD Engine 354 maintains state and metadata associated with a plurality of VSD objects 355. Each VSD object 355 may include a mapping table that associates each block of addresses (i.e., an address range) in the VSD with a corresponding block of addresses in one or more RSDs 214. The VSD objects 355 may include various state associated with a VSD such as a VSD identifier (i.e., handle), a base address of the VSD object 355 in the memory 212, a size of the VSD, a format of the VSD (e.g., filesystem, block size, etc.), and the like.

The VSD Engine 354 may also maintain state and metadata associated with a plurality of RSD objects 356. Each RSD object 356 may correspond to an RSD 214 connected to the node 210 or an RSD 214 accessible on another node 210 via the network 370. The RSD objects 356 may include various state associated with the RSDs 214 such as an RSD identifier (i.e., handle), a base address of the RSD object 356 in the memory 212, a size of the RSD 214, a format of the RSD 214 (e.g., filesystem, block size, etc.), and the like. The RSD object 214 may also track errors associated with the RSD 214.

The VSD objects 355 and the RSD objects 356 are abstraction layers implemented by the VSD Engine 354 that enable VMs 360, via the BE Daemon 350, to store data on the RSDs 214. In one embodiment, the VSD abstraction layer is a set of objects defined using an object-oriented programming (OOP) language. As used herein, an object is an instantiation of a class and comprises a data structure in memory that includes fields and pointers to methods implemented by the class. The VSD abstraction layer defines a VSD class that implements a common interface for all VSD objects that includes the following methods: Create; Open; Close; Read; Write; Flush; Discard; and a set of methods for creating a snapshot of the VSD. A snapshot is a data structure that stores the state of the VSD at a particular point in time. The Create method generates the metadata associated with a VSD and stores the metadata on an RSD 214, making the VSD available to all nodes 210 in the cluster 200. The Open method enables applications in the VMs 360 to access the VSD (i.e., the I/O buffers 316 are generated in the shared memory 315 and the VSD is mounted to the guest OS 361). The Close method prevents applications in the VMs 360 from accessing the VSD. The Read method enables the BE Server 352 to read data from the VSD. The Write method enables the BE Server 352 to write data to the VSD. The Flush method flushes all pending I/O requests associated with the VSD. The Discard method discards a particular portion of data stored in memory associated with the VSD.

In one embodiment, two types of VSD objects 355 inherit from the generic VSD class: a SimpleVSD object and a ReliableVSD object. The SimpleVSD object is a simple virtual storage device that maps each block of addresses in the VSD to a single, corresponding block of addresses in an RSD 214. In other words, each block of data in the SimpleVSD object is only stored in a single location. The SimpleVSD object provides a high performance virtual storage solution but lacks reliability. In contrast, the ReliableVSD object is a redundant storage device that maps each block of addresses in the VSD to two or more corresponding blocks in two or more RSDs 214. In other words, the ReliableVSD object provides n-way replicated data and metadata. The ReliableVSD object may also implement error checking with optional data and/or metadata checksums. In one embodiment, the ReliableVSD object may be configured to store up to 15 redundant copies (i.e., 16 total copies) of the data stored in the VSD. The SimpleVSD object may be used for non-important data while the ReliableVSD object attempts to store data in a manner that prevents a single point of failure (SPOF) as well as provide certain automatic recovery capabilities when one or more nodes experiences a failure. The VSD Engine 354 may manage multiple types of VSD objects 355 simultaneously such that some data may be stored on SimpleVSD type VSDs and other data may be stored on ReliableVSD type VSDs. It will be appreciated that the two types of VSDs described herein are only two possible examples of VSD objects inheriting from the VSD class and other types of VSD objects 355 are contemplated as being within the scope of the present disclosure.

The VSD Engine 354 may also implement an RSD abstraction layer that provides access to all of the RSDs 214 coupled to the one or more nodes 210 of the cluster 200. The RSD abstraction layer enables communications with both local and remote RSDs 214. As used herein, a local RSD is an RSD 214 included in a particular node 210 that is hosting the instance of the BE Daemon 350. In contrast, a remote RSD is an RSD 214 included in a node 210 that is not hosting the instance of the BE Daemon 350 and is accessible via a network 370. The RSD abstraction layer provides reliable communications as well as passing disk or media errors from both local and remote RSDs 214 to the BE Daemon 350.

In one embodiment, the RSD abstraction layer is a set of objects defined using an OOP language. The RSD abstraction layer defines an RSD class that implements a common interface for all RSD objects 356 that includes the following methods: Read; Write; Allocate; and UpdateRefCounts. Each RSD object 356 is associated with a single RSD 214. In one embodiment, the methods of the RSD class are controlled by a pair of state machines that may be triggered by either the reception of packets from remote nodes 210 on the network 370 or the expiration of timers (e.g., interrupts). The Read method enables BE Server 352 to read data from the RSD 214. The Write method enables BE Server 352 to write data to the RSD 214. The Allocate method allocates a block of memory in the RSD 214 for storing data. The UpdateRefCounts method updates the reference counts for each block of the RSD 214, enabling deallocation of blocks with reference counts of zero (i.e., garbage collection).

In one embodiment, two types of RSD objects 356 inherit from the RSD class: an RSDLocal object and an RSDRemote object. The RSDLocal object implements the interface defined by the RSD class for local RSDs 214, while the RSDRemote object implements the interface defined by the RSD class for remote RSDs 214. The main difference between the RSDLocal objects and the RSDRemote objects are that the I/O Manager 353 asynchronously handles all I/O between the BE Server 352 and local RSDs 214, while the BE Remote Protocol 351 handles all I/O between the BE Server 352 and remote RSDs 214.

As discussed above, the SysMon 320 is responsible for the provisioning and monitoring of VSDs. In one embodiment, the SysMon 320 includes logic for generating instances of the VSD objects 355 and the RSD objects 356 in the memory 212 based on various parameters. For example, the SysMon 320 may discover how many RSDs 214 are connected to the nodes 210 of the cluster 200 and create a different RSD object 356 for each RSD 214 discovered. The SysMon 320 may also include logic for determining how many VSD objects should be created and or shared by the VMs 360 implemented on the node 210. Once the SysMon 320 has generated the instances of the VSD objects 355 and the RSD objects 356 in the memory 212, the BE Daemon 350 is configured to manage the functions of the VSDs and the RSDs 214.

In one embodiment, the VSD Engine 354 implements a placement specification that is configured to pick a set of RSDs 214 to associate with a particular block or blocks of memory in the VSD. The placement specification may be implemented as a set of methods or functions included in the VSD Engine 354. Although the VSD Engine 354 is shown here as a separate component of the BE Daemon 350 that is separate and distinct from each of the VSD objects 355, in another embodiment, the functions of the VSD Engine 354 may be implemented as a component of the VSD objects 355. In other words, the methods comprising the VSD Engine may be incorporated within the VSD objects 355 themselves.

As described above, each RSD object 356 implements an Allocate method that returns a pointer to a block of memory in the corresponding RSD 214. The placement specification may be implemented as a function associated with a VSD object 355 that takes a plurality of inputs and returns a set of RSD objects 356 on which data for the VSD should be stored. The placement specification may be called whenever (1) the BE Server 352 requests data to be written to a new block of the VSD; (2) when data is relocated from one RSD 214 to a new RSD 214 due to a failure (e.g., the RSD 214 goes offline or the RSD 214 crashes such that the data cannot be recovered); or (3) migration of the data is triggered either manually by a user or automatically by the BE Daemon 350 or SysMon 320. Each time the placement specification is called, the method may receive a plurality of inputs and return a set of RSD objects 356. The inputs may comprise a count input, a vector of allowed RSD objects 356, a vector of pre-placed RSD objects 356, and a VSD block index. The count input specifies the total number of copies of the data based on n-way replication (e.g., 3 for 3-way replication of the data). For SimpleVSD objects, the count input is set to one. For ReliableVSD objects, the count input will be set to two or more. The vector of allowed RSD objects 356 includes a set of RSD objects 356 that are available to be selected by the placement specification. The set of allowed RSD objects 356 may be associated with only a subset of all RSDs 214 connected to the cluster 200. For example, in specific cases, the set of allowed RSD objects 356 may only include the RSD objects 356 associated with RSDs 214 connected to that particular node 210. The vector of pre-placed RSD objects 356 may include a set of one or more RSD objects 356 associated with RSDs 214 that currently store a copy of the data. For example, in the case where two copies of a block of the VSD are stored on RSD 2 and RSD 3, for a node 210 having four RSDs 214 (RSD 0, RSD 1, RSD 2, and RSD 3), and RSD 2 goes offline such that the placement spec is consulted regarding determining a new RSD 214 on which to store a copy of the data, the vector of pre-placed RSD objects 356 may include identifiers for RSD 2 and RSD 3. The placement spec will attempt to return a solution set that includes RSD objects 356 that already store a valid copy of the data to avoid unnecessary bandwidth for copying data from one device to another. The VSD block index identifies the particular block of the VSD object 355 for which data is to be stored. The set of RSD objects 356 returned by the method identifies one or more RSD objects 356 associated with RSDs 214 on which the data should be stored.

In one example, when an application 364 writes data to a previously unused block of addresses in a VSD, the BE client 363 will send a request to the BE Server 352 to write the data to the VSD. If the VSD 414 is configured as a SimpleVSD object, then the BE Server 352 will call the placement specification method (either in the VSD Engine 354 or within the VSD object 355 itself) with a count input of '1' in order to select a single RSD object 356 from the vector of allowed RSD objects 356. Once the set of selected RSD objects 356 has been returned by the placement specification, the BE Server 352 will allocate memory within the selected RSD 214 by calling the corresponding method in the RSD object 356 and copy the data to the allocated memory location in the RSD 214. Alternately, if the VSD is configured as a ReliableVSD object, then the BE Server 352 will call the placement specification method with a count input of 'n' in order to select n RSD objects 356 from the vector of allowed RSD objects 356. Once the set of selected RSD objects 356 has been returned by the placement specification, the BE Server 352 will allocate memory within the selected RSDs 214 by calling the corresponding methods in the RSD objects 356 and copy the data to the allocated memory locations in the RSDs 214.

It will be appreciated that the BE Daemon 350 may implement a variety of performance monitoring techniques in order to track the performance of the data storage system. For example, the BE Daemon 350 may track a size of each RSD 214, utilization measurements for each RSD 214, an average number of Input/Output Operations Per Second (IOPS) for each RSD 214, a locality for each RSD 214 (i.e., a datacenter identifier, rack identifier, etc.), an error rate for each RSD 214 (i.e., a number of read errors and/or write errors may be tracked, separately or combined), and the like. The placement specification in the VSD Engine 354, being implemented within the scope of the BE Daemon 350, can therefore utilize this performance data when determining which RSD objects 356 to select as part of the solution set.

In one embodiment, the placement specification in the VSD Engine 354 is configured to implement a simple round-robin algorithm in order to select the solution set. In other words, the VSD Engine 354 may implement a counter such that each time the placement specification is called, the set of selected RSD objects 356 is based on the value of the counter, incrementing the counter for each RSD object 356 selected. When the counter value exceeds the total number of RSD objects 356, the counter value is reset back to the initial value of the counter (e.g., 0). It will be appreciated, that this algorithm will distribute the data uniformly across the set of available RSDs 214, but as data is deleted or dereferenced such that one or more blocks of the RSDs 214 may be deallocated, this type of distribution may become inefficient.

In another embodiment, the placement specification in the VSD Engine 354 is configured to implement a locality-based algorithm in order to select the solution set. In other words, each RSD 214, when installed, may be assigned a locality identifier that specifies a physical location of the device. In one embodiment, the locality identifier may be a 32-bit value that encodes the row of the datacenter the RSD 214 is installed in, the rack in the row the RSD 214 is installed in, the node in the rack the RSD 214 is installed in, and a drive number in the node the RSD 214 is installed in. In other words, the locality identifier may be a 4-tuple of 8-bit identifiers corresponding to the row, rack, node, and drive. In alternative embodiments, the locality identifier may contain a greater or fewer number of bits than 32 bits (e.g., 64-bits) and may identify additional or fewer hierarchical levels (e.g., a datacenter identifier or country/timezone). The locality-based algorithm may then be configured to ensure that the solution set includes RSD objects 356 located in physically distinct locations. In one embodiment, the locality-based algorithm will attempt to ensure that each of the selected RSDs 214 is in a different row of the datacenter. If there are not enough RSDs 214 in different rows to equal the requested count, then the locality-based algorithm will then attempt to select RSDs 214 within the same row but different racks, RSDs 214 within the same rack, but different nodes 210, and RSDs 214 within the same node 210 but different drives. One of the main goals of the ReliableVSD object is to ensure that there is no SPOF. In implementing the placement specification to use a locality-based algorithm, the goal is to prevent all redundant copies of data from being stored in a single location susceptible to a SPOF such as a power supply failure, a utility power outage, a fire, or the like.

In one embodiment, the placement specification in the VSD Engine 354 may be configured to select RSD objects 356 based on a failure group identifier associated with each RSD 214. For example, during provisioning of the cluster 200, each RSD 214 associated with a particular node 210 may be assigned the same failure group identifier. The placement specification may be configured to attempt to select RSD objects 356 associated with different failure group identifiers whenever possible. In one embodiment, the failure group identifier may be manually assigned to a particular RSD 214 when the node 210 is configured. In another embodiment, the failure group identifier may be automatically assigned based on the locality identifier. For example, the locality identifier may be automatically assigned to a particular RSD 214 based on which node, rack, and row, the RSD 214 is connected to, and the failure group identifier may be generated by applying a mask to the locality identifier.

In one embodiment, a two-level round robin technique may be implemented for selecting RSD objects 356 from different failure groups. For example, a first counter may be implemented that has a value associated with a particular failure group. For each RSD object 356 selected for the solution set, the first counter is incremented. In addition, a second counter is also implemented to select a particular RSD object 356 from within the particular failure group. Thus, the first counter causes each subsequent RSD object 356 selected to be located in a different failure group, and the second counter causes the particular RSD objects 356 selected from within that failure group to be distributed across the RSD objects 356 of that failure group over multiple calls of the placement specification.

In yet another embodiment, the placement specification in the VSD Engine 354 may optimize the allocation of RSDs 214 based on performance data tracked by the BE Daemon 350. For example, the BE Daemon 350 may track how often a particular block of memory within the VSD is accessed by one or more applications. Blocks associated with more frequent data access requests may be allocated to more efficient RSDs 214 (e.g., RSDs 214 having a faster response time). The placement specification may periodically move blocks from one RSD 214 to another RSD 214 to improve performance. The BE Server 352 may track how many times a particular block has been accessed over a certain time period. Blocks that are accessed more frequently may be moved to more efficient RSDs 214 such as a solid state drive, or an RSD 214 in the same node 210 as the originator of the access requests.

In still yet another embodiment, the placement specification in the VSD Engine 354 may implement an algorithm that utilizes weighted factors from a variety of different performance metrics (i.e., parameters). A score may be calculated for each of the allowed RSD objects 356 and the RSD objects 356 with the highest score may be selected as part of the solution set. The score may be calculated based on factors such as utilization (i.e., a number of allocated/free blocks), a capacity, an average IOPS, a locality identifier, a failure group identifier, a pre-placed indication, etc. In one embodiment, each of the factors may be weighted. For example, more weight may be given to the utilization measurement or IOPS parameters rather than the locality identifier or the pre-placed indication.

In yet another embodiment, the placement specification in the VSD Engine 354 may select a solution set based on a hash function of the input parameters. For example, the hash function may comprise a weighted consistent hash algorithm based on, e.g., the VSD block index parameter passed to the placement specification. The VSD block index enables the placement specification to determine efficient placement of data in the RSDs 214 in terms of VSD memory locality. The resulting hash values may be mapped to one or more RSD objects 356 for the solution set based on hash values associated with each of the RSD objects 356.

Figure 4:
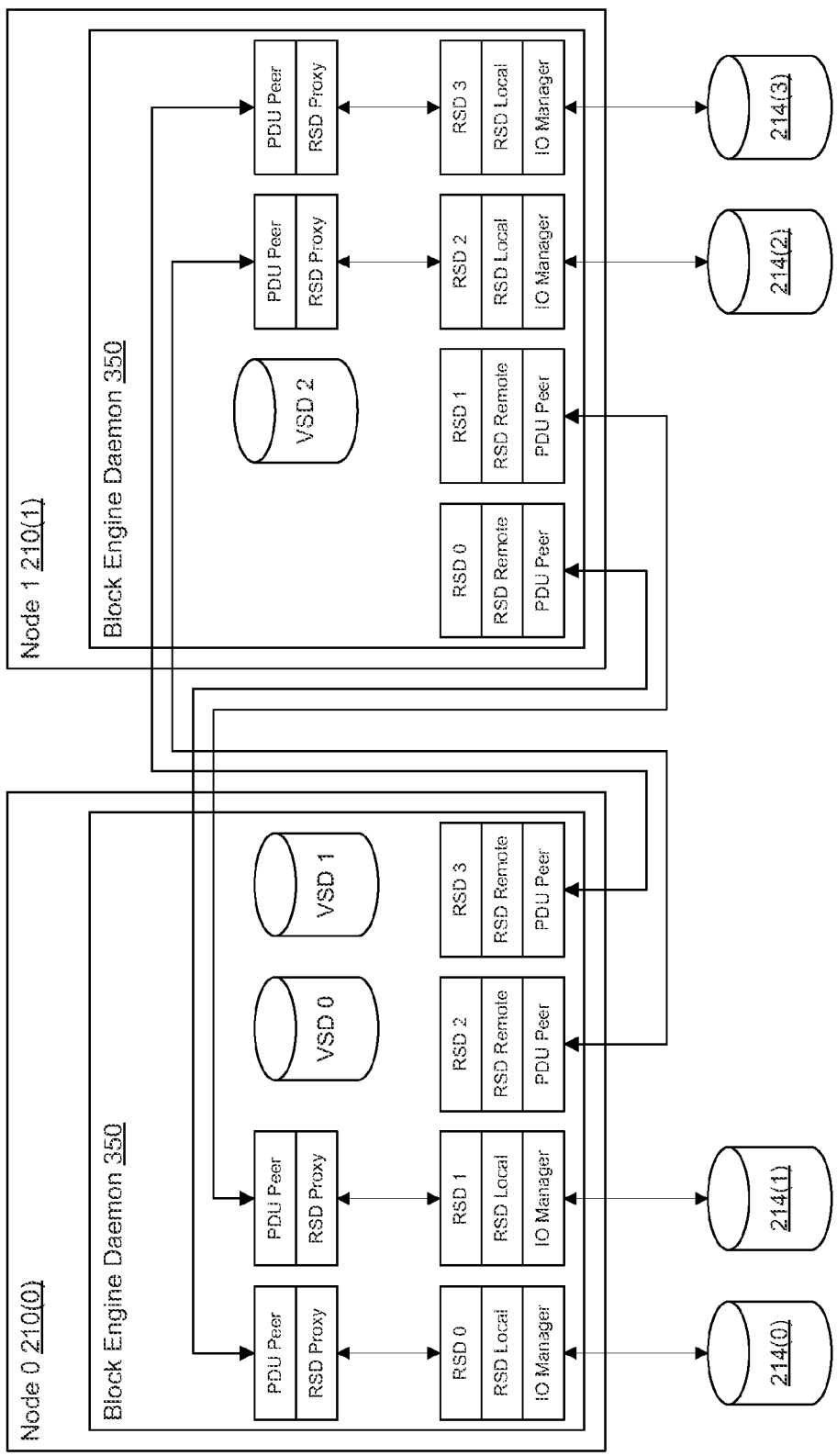
FIG. 4 illustrates the abstraction layers implemented by the block engine daemon for two nodes of the cluster, in accordance with one embodiment.

FIG. 4 is a conceptual diagram of the abstraction layers implemented by the BE Daemon 350 for two nodes 210 of the cluster 200, in accordance with one embodiment. A first node 210(0) is coupled to two local RSDs (i.e., 214(0) and 214(1)) and two remote RSDs (i.e., 214(2) and 214(3)) via the network 370. Similarly, a second node 210(1) is coupled to two local RSDs (i.e., 214(2) and 214(3)) and two remote RSDs (i.e., 214(0) and 214(1)) via the network 370. The RSD abstraction layer includes four RSD objects 356 (i.e., RSD 0, RSD 1, RSD 2, and RSD 3). In the first node 210(0), RSD 0 and RSD 1 are RSDLocal objects and RSD 2 and RSD 3 are RSDRemote objects.

The first node 210(0) accesses the first RSD 214(0) and the second RSD 214(1) via the I/O Manager library that makes system calls to the host operating system 311 in order to asynchronously read or write data to the local RSDs 214. An RSDLocal library is configured to provide an interface for applications communicating with the BE Daemon 350 to read or write to the local RSDs 214. The RSDLocal library may call methods defined by the interface implemented by the IOManager library. The first node 210(0) accesses the third RSD 214(2) and the fourth RSD 214(3) indirectly via a Protocol Data Unit Peer (PDUPeer) library that makes system calls to the host operating system 311 in order to communicate with other nodes 210 using the NIC 213. The PDUPeer library generates packets that include I/O requests for the remote RSDs (e.g., 214(2) and 214(3)). The packets may include information that specifies the type of request as well as data or a pointer to the data in the memory 212. For example, a packet may include data and a request to write the data to one of the remote RSDs 214. The request may include an address that specifies a block in the RSD 214 to write the data to and a size of the data. Alternately, a packet may include a request to read data from the remote RSD 214. The RSDProxy library unpacks requests from the packets received from the PDUPeer library and transmits the requests to the associated local RSD objects 356 as if the requests originated within the node 210.

The BE Remote Protocol 351, the BE Server 352, and the I/O Manager 353 implement various aspects of the RSD abstraction layer shown in FIG. 4. For example, the BE Remote Protocol 351 implements the RSDRremote library, RSDProxy library, and the PDUPeer library and the I/O Manager 353 implements the RSDLocal library and the IOManager library. The second node 210(1) is configured similarly to the first node 210(0) except that the RSD objects 356 RSD 0 and RSD 1 are RSDRemote objects linked to the first RSD 214(0) and the second RSD 214(1), respectively, and the RSD objects 356 RSD 2 and RSD 3 are RSDLocal objects linked to the third RSD 214(2) and the fourth RSD 214(3), respectively.

The VSD abstraction layer includes three VSD objects 355 (i.e., VSD 0, VSD 1, and VSD 2). In the first node 210(0), VSD 0 and VSD 1 are ReliableVSD objects. In the second node 210(1), VSD 2 is a ReliableVSD object. It will be appreciated that one or more of the VSD objects 355 may be instantiated as SimpleVSD objects, and that the particular types of objects chosen depends on the characteristics of the system. Again, the VSD objects 355 provide an interface to map I/O requests associated with the corresponding VSD to one or more corresponding I/O requests associated with one or more RSDs 214. The VSD objects 355, through the Read or Write methods, are configured to translate the I/O request received from the BE Server 352 and generate corresponding I/O requests for the RSD(s) 214 based on the mapping table included in the VSD object 355. The translated I/O request is transmitted to the corresponding RSD 214 via the Read or Write methods in the RSD object 356.

Figure 5A:
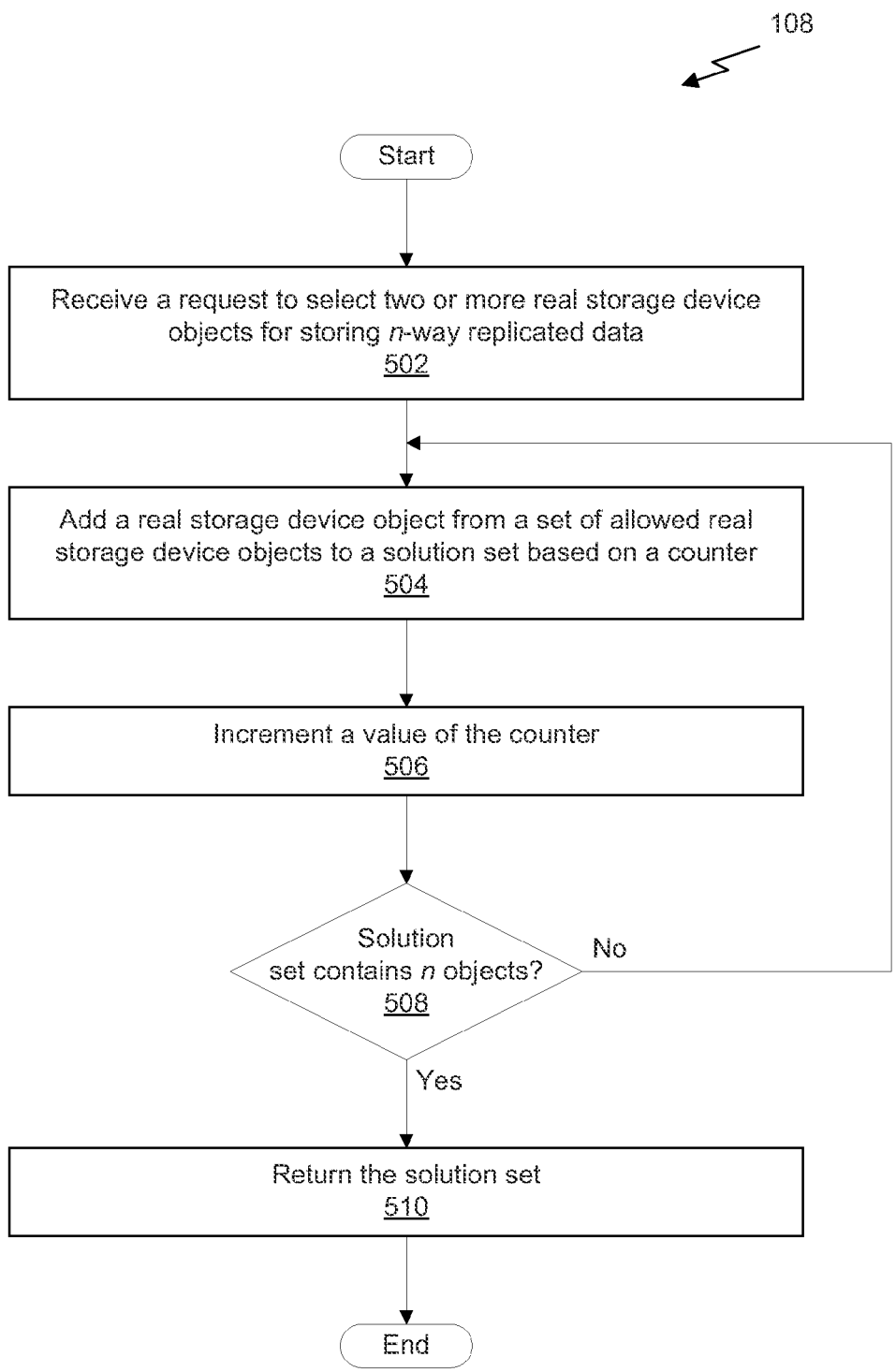
FIG. 5A illustrates a flowchart of a method for implementing a step of the method of FIG. 1, in accordance with one embodiment.

FIG. 5A illustrates a flowchart of a method for implementing the step 108 of method 100, in accordance with one embodiment. Although the method is described in the context of a program executed by a processor, the method may also be performed by custom circuitry or by a combination of custom circuitry and a program. At step 502, the VSD Engine 354 receives a request to select one or more RSD objects 356 for storing n-way replicated data. At step 504, the VSD Engine 354 adds an RSD object 356 from a set of allowed RSD objects 356 to a solution set based on a value of a counter. In one embodiment, the value of the counter may be mapped to a particular RSD object 356 in the set of allowed RSD objects 356 by the formula RSD_id=Counter % num_RSDs, where the % operator is the modulus (i.e., remainder) of dividing the value of the counter by the total number of RSD objects 536 in the set of allowed RSD objects 356. At step 506, the value of the counter is incremented. At step 508, the VSD Engine 354 determines whether the solution set contains n RSD objects 356. The number n may be specified within the received request as an input parameter. If the solution set does not contain n RSD objects, then steps 504 and 506 may be repeated to add another RSD object 356 to the solution set. However, if the solution set contains n RSD objects, then, at step 510, the solution set is returned. The solution set comprises a vector of RSD objects 356 (or pointers to RSD objects 356) that specifies the one or more RSD objects 356 selected to store the data.

Figure 5B:
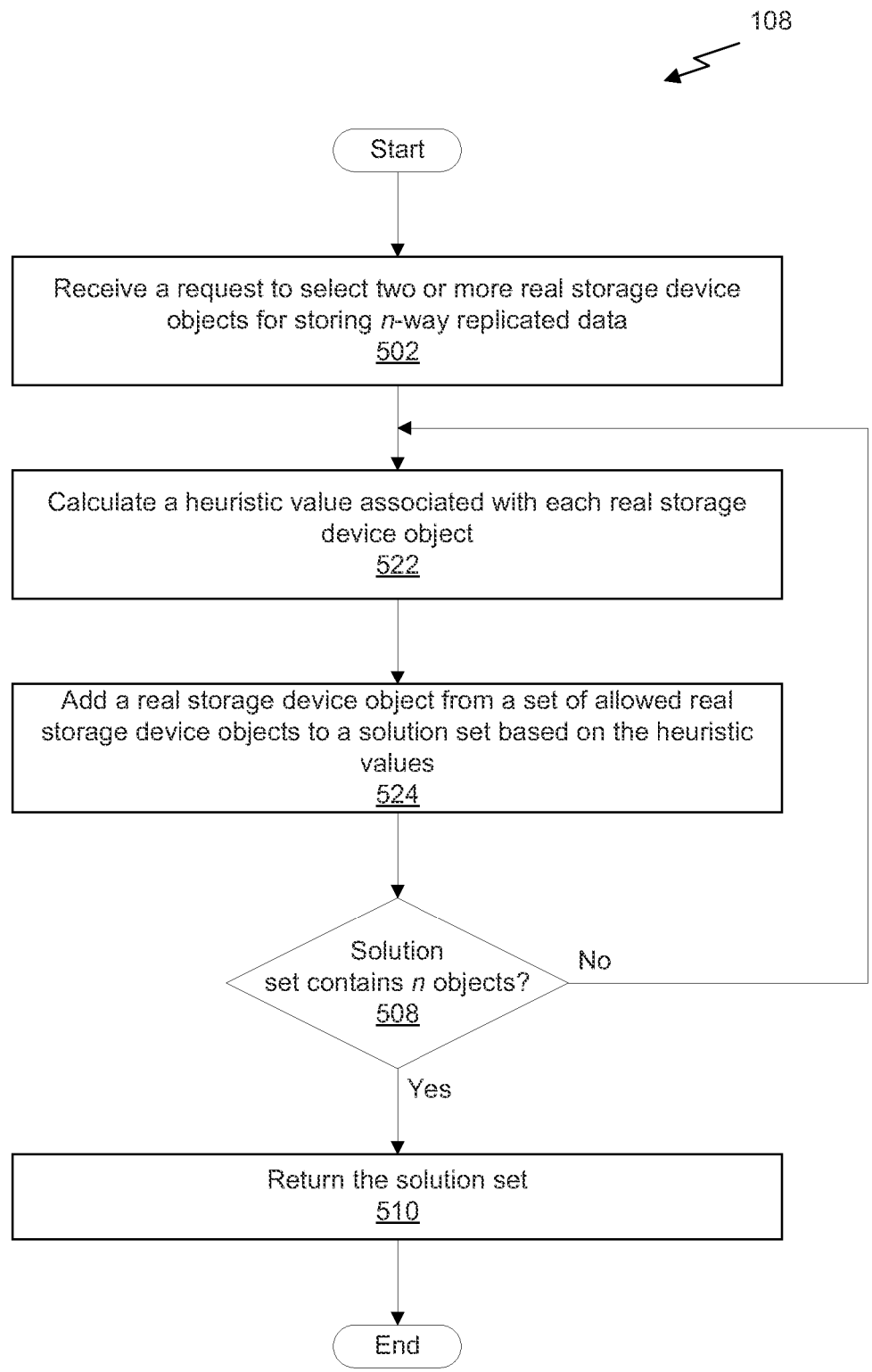
FIG. 5B illustrates a flowchart of a method for implementing the step of the method of FIG. 1, in accordance with another embodiment.

FIG. 5B illustrates a flowchart of a method for implementing the step 108 of method 100, in accordance with another embodiment. At step 502, the VSD Engine 354 receives a request to select one or more RSD objects for storing n-way replicated data. At step 522, the VSD Engine 354 calculates a heuristic value associated with each RSD object 356. In one embodiment, the heuristic value is calculated based on a formula that combines scores related to one or more tracked parameters for the RSD 214 corresponding to the RSD object 356. For example, the RSD object 356 may indicate that the corresponding RSD 214 has an IOPS value of 200, which is translated to a score, e.g., a range between 0.0 and 1.0, where 0.0 corresponds to a minimum IOPS and 1.0 corresponds to a maximum IOPS. In another example, a score between 0.0 and 1.0 may correspond to a percentage of free blocks in the RSD 214 (i.e., a ratio of unallocated blocks of memory to total blocks of memory). In yet another example, a score between 0.0 and 1.0 may correspond to an error rate for the RSD 214 (i.e., a ratio of reads/writes that result in an error to a total number of reads/writes).

In another embodiment, the heuristic values may be calculated based on a weighted function of one or more parameters. For example, the following function provides an example weighted function for calculating a heuristic value:

$$H = \Sigma W_i * r_i \quad \text{(Eq. 1)}$$

where $W_i$ are the weights given to particular components, $r_i$ are the components of the heuristic function, and H is the heuristic value. In one embodiment, the heuristic value may be calculated using three weighted components: (1) IOPS; (2) the number of free blocks; and (3) an error rate. For example, Equation 2, shown below, represents the equation for the heuristic value:

$$H = W_0 * \left(\frac{IOPS}{IOPS_{max}}\right) + W_1 * \left(\frac{blocks}{blocks_{total}}\right) + W_2 * \left(\frac{error}{error_{avg}}\right), \quad \text{(Eq. 2)}$$

where $W_0$ is the weight associated with the first component, $W_1$ is the weight associated with the second component, and $W_2$ is the weight associated with the third component. It will be noted that the weights may be positive or negative; e.g., $W_2$ may be a negative value such that the weighted term associated with error rate is subtracted from the sum of the other weighted terms. As shown above, each of the components of Equation 2 is a ratio of a value associated with the RSD 214 and a value associated with the cluster 200. For example, the first component is derived from dividing the IOPS for the RSD 214 with a maximum IOPS for all RSDs 214 in the cluster 200, the second component is derived from dividing the number of free blocks in the RSD 214 with the total number of free blocks in the cluster 200, and the third component is derived from dividing the error rate of the RSD 214 with the average error rate of all RSDs 214 in the cluster 200. It will be appreciated that the example heuristic functions provided above are for illustrative purposes only and that any heuristic function based on one or more characteristics of the cluster 200 is within the scope of the present description.

At step 524, the VSD Engine 354 adds an RSD object 356 from a set of allowed RSD objects 356 to a solution set based on the heuristic values. In one embodiment, the VSD Engine 354 selects the RSD object 356 associated with the highest heuristic value. At step 508, the VSD Engine 354 determines whether the solution set contains n RSD objects 356. The number n may be specified within the received request. If the solution set does not contain n RSD objects 356, then steps 522 and 524 may be repeated to add another RSD object 356 to the solution set. However, if the solution set contains n RSD objects, then, at step 510, the solution set is returned.

Figure 6:
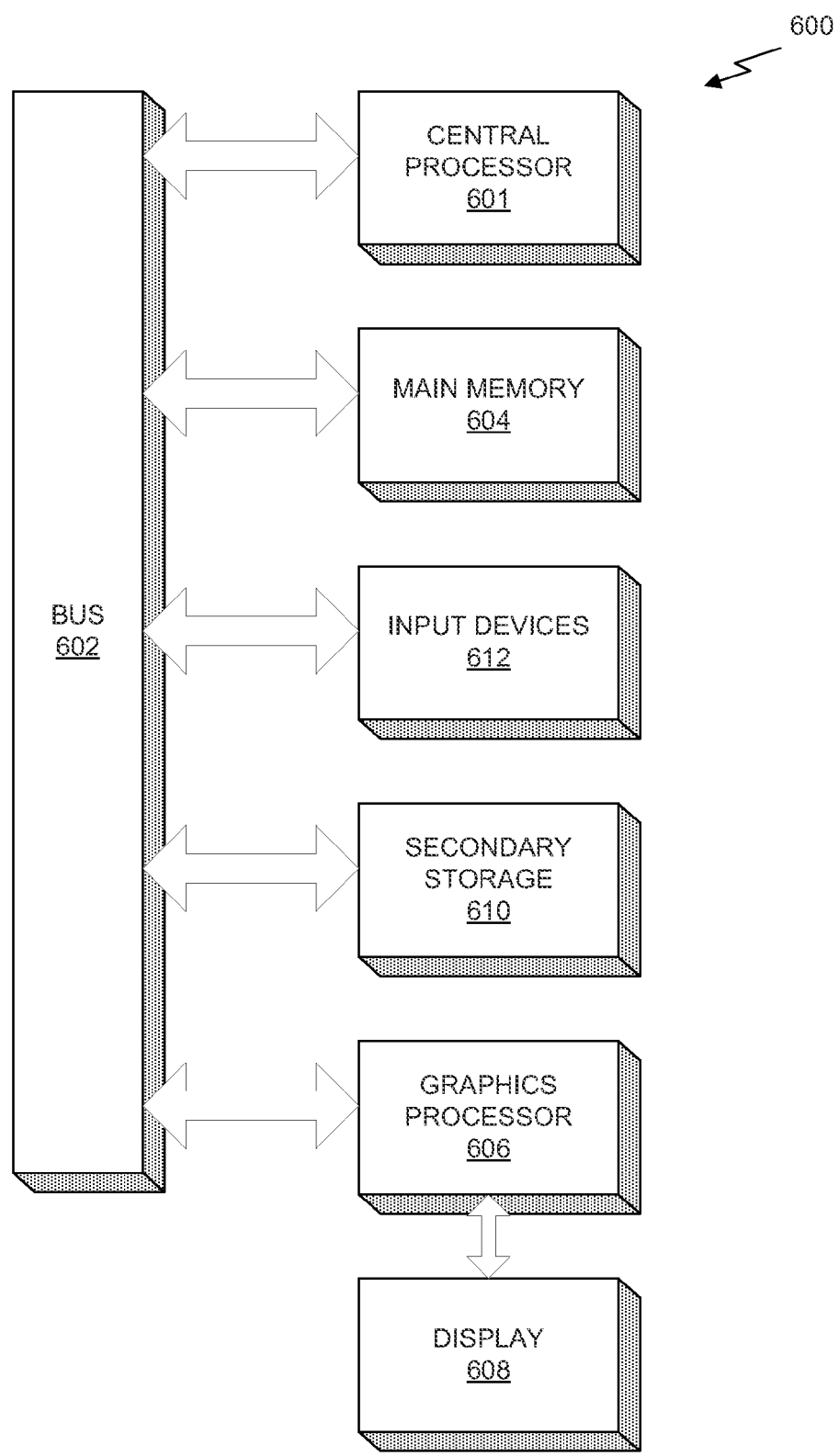
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The system 600 may comprise a node 210 of the cluster 200. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   tracking one or more parameters associated with a plurality of real storage devices (RSDs);
   generating a plurality of RSD objects in a memory associated with a first node, each RSD object corresponding to a particular RSD in the plurality of RSDs;
   generating a virtual storage device (VSD) object in the memory;
   selecting one or more RSD objects in the plurality of RSD objects based on at least one parameter in the one or more parameters; and
   for each RSD object in the one or more RSD objects, allocating a block of memory in the RSD associated with the RSD object to store data corresponding to a first block of memory associated with the VSD object,
   wherein each RSD object is associated with a failure group identifier that comprises a 32-bit integer that encodes a drive identifier, a node identifier, a rack identifier, and a row identifier.

2. The method of claim 1, wherein each RSD comprises a device selected from the group consisting of a hard disk drive, a solid state drive, a tape drive, and an optical disc drive.

3. The method of claim 1, wherein each VSD object comprises a data structure that includes a mapping table that associates ranges of addresses associated with the VSD object with one or more blocks of memory included in the plurality of RSDs.

4. The method of claim 1, wherein selecting the one or more RSD objects in the plurality of RSD objects comprises:
   adding an RSD object to a solution set based on a value of a counter;
   incrementing the value of the counter;
   determining whether the solution set includes less than a threshold number of RSD objects; and
   if the solution set includes less than the threshold number of RSD objects, then adding another RSD object to the solution set, or
   if the solution set includes greater than or equal to the threshold number of RSD objects, then selecting the RSD objects in the solution set as the one or more RSD objects.

5. The method of claim 1, wherein selecting the one or more RSD objects in the plurality of RSD objects comprises selecting one or more RSD objects from a set of allowed RSD objects, each RSD object of the one or more RSD objects having a unique failure group identifier with respect to each of the other RSD objects in the one or more RSD objects.

6. The method of claim 5, wherein failure group identifiers for each RSD object are generated automatically during provisioning of a cluster of nodes.

7. The method of claim 1, wherein selecting the one or more RSD objects in the plurality of RSD objects comprises:
   calculating a heuristic value associated with each RSD object in the plurality of RSD objects, wherein the heuristic value is based on the one or more parameters associated with an RSD corresponding to the RSD object; and
   selecting the one or more RSD objects based on the heuristic values.

8. The method of claim 7, wherein the one or more parameters comprises a number of input/output operations per second (IOPS) for the RSD.

9. The method of claim 7, wherein the one or more parameters comprises a utilization measurement for the RSD.

10. The method of claim 7, wherein the one or more parameters comprises an error rate for the RSD.

11. The method of claim 7, wherein the one or more parameters comprises at least two parameters selected from the group consisting of a utilization measurement for the RSD, a number of input/output operations per second (IOPS) for the RSD, a failure group identifier for the RSD, an error rate for the RSD, and an indication of whether the data is pre-placed on the RSD.

12. The method of claim 11, wherein each parameter of the one or more parameters is weighted.

13. The method of claim 1, further comprising periodically checking the one or more RSD objects allocated to the first block of memory based on a utilization rate of the first block of memory.

14. The method of claim 13, further comprising, if the utilization rate is above a threshold value, then copying data associated with the first block of memory from a first RSD to a second RSD, wherein a response time parameter value associated with the second RSD is greater than a response time parameter value associated with the first RSD.

15. A system comprising:
   one or more virtual machines implemented by a first node in a cluster of nodes; and
   a process in communication with each of the one or more virtual machines, the process being executed by the first node and configured to:
      track one or more parameters associated with a plurality of real storage devices (RSDs),
      generate a plurality of RSD objects in a memory associated with the first node, each RSD object corresponding to a particular RSD in the plurality of RSDs,
      generate a virtual storage device (VSD) object in the memory,
      select one or more RSD objects in the plurality of RSD objects based on at least one parameter in the one or more parameters, and
      for each RSD object in the one or more RSD objects, allocate a block of memory in the RSD associated with the RSD object to store data corresponding to a first block of memory associated with the VSD object,
wherein each RSD object is associated with a failure group identifier that comprises a 32-bit integer that encodes a drive identifier, a node identifier, a rack identifier, and a row identifier.

16. The system of claim 15, further comprising:
one or more additional virtual machines implemented on a second node of the cluster; and
a second process in communication with the one or more additional virtual machines, the second process being executed by the second node and configured to:
track the one or more parameters associated with the plurality of RSDs, generate a second plurality of RSD objects in a memory associated with the second node, and
generate a second VSD object in the memory associated with the second node.

17. The system of claim 16, wherein the process is further configured to:
generate input/output (I/O) requests associated with a first RSD coupled to the second node; and
transmit the I/O requests to the second node via a network.

18. The system of claim 15, wherein, to select the one or more RSD objects in the plurality of RSD objects, the process is configured to:
calculate a heuristic value associated with each RSD object in the plurality of RSD objects, wherein the heuristic value is based on the one or more parameters associated with an RSD corresponding to the RSD object; and
select the one or more RSD objects based on the heuristic values.

19. A non-transitory computer-readable storage medium storing instructions that, when executed by a processor, cause the processor to perform steps comprising:
tracking one or more parameters associated with a plurality of real storage devices (RSDs);
generating a plurality of RSD objects in a memory associated with a first node, each RSD object corresponding to a particular RSD in the plurality of RSDs;
generating a virtual storage device (VSD) object in the memory;
selecting one or more RSD objects in the plurality of RSD objects based on at least one parameter in the one or more parameters; and
for each RSD object in the one or more RSD objects, allocating a block of memory in the RSD associated with the RSD object to store data corresponding to a first block of memory associated with the VSD object,
wherein each RSD object is associated with a failure group identifier that comprises a 32-bit integer that encodes a drive identifier, a node identifier, a rack identifier, and a row identifier.

* * * * *